United States Patent [19]

Katsuma

[11] Patent Number: 5,398,123
[45] Date of Patent: Mar. 14, 1995

[54] IMAGE PROCESSING METHOD AND APPARATUS CAPABLE OF AUTOMATIC COLOR MASKING

[75] Inventor: Makoto Katsuma, Kawaguchi, Japan

[73] Assignee: Canon Kabushiki Kaisha, Tokyo, Japan

[21] Appl. No.: 397,896

[22] Filed: Aug. 24, 1989

[30] Foreign Application Priority Data

Aug. 31, 1988 [JP] Japan .................. 63-216928
Aug. 31, 1988 [JP] Japan .................. 63-216938

[51] Int. Cl.⁶ .................. H04N 1/46; G03F 3/08
[52] U.S. Cl. .................. 358/518; 358/520
[58] Field of Search .................. 388/80, 75–79, 388/296, 458, 455; 358/486, 29, 27, 28, 443, 518, 516, 517, 519, 520, 221, 522; 348/655; H04N 1/46, 9/04, 9/64

[56] References Cited

U.S. PATENT DOCUMENTS

| | | | |
|---|---|---|---|
| 4,064,529 | 12/1977 | Seer, Jr. .................. | 358/29 C |
| 4,314,274 | 2/1982 | Atoji et al. .................. | 358/80 |
| 4,679,074 | 7/1987 | Sugiura et al. .................. | 358/80 |
| 4,689,691 | 8/1987 | Isogai et al. .................. | 358/80 |
| 4,731,662 | 3/1988 | Udagawa et al. .................. | 358/520 |
| 4,739,397 | 4/1988 | Hayashi .................. | 358/80 |
| 4,864,392 | 9/1989 | Sato .................. | 358/80 |
| 4,876,610 | 10/1989 | Ohsawa et al. .................. | 358/456 |
| 4,908,701 | 3/1990 | Udagawa .................. | 358/80 |
| 4,928,167 | 5/1990 | Tatsumi et al. .................. | 358/80 |
| 4,977,448 | 12/1990 | Murata et al. .................. | 358/75 |
| 4,982,277 | 1/1991 | Katoh et al. .................. | 388/520 |
| 5,031,034 | 7/1991 | Shimizu et al. .................. | 358/79 |

FOREIGN PATENT DOCUMENTS

| | | | |
|---|---|---|---|
| 2450474 | 9/1980 | France .................. | G03F 3/08 |
| 3408337 | 9/1984 | Germany .................. | H04N 5/20 |
| 3409771 | 9/1984 | Germany .................. | H04N 1/46 |
| 2148658 | 5/1985 | United Kingdom .................. | H04N 1/10 |

*Primary Examiner*—James J. Groody
*Assistant Examiner*—Michael H. Lee
*Attorney, Agent, or Firm*—Fitzpatrick, Cella, Harper & Scinto

[57] ABSTRACT

An image processing method and apparatus are disclosed, wherein differences between maximum and minimum values for predetermined pixel data of a color image to be processed, for three dimensional pixel data, are calculated, a color correction masking coefficient is determined in accordance with the operation result. If necessary, the image is judged to determine if it requires color masking correction, and thereafter the color correction masking coefficient is determined.

15 Claims, 7 Drawing Sheets

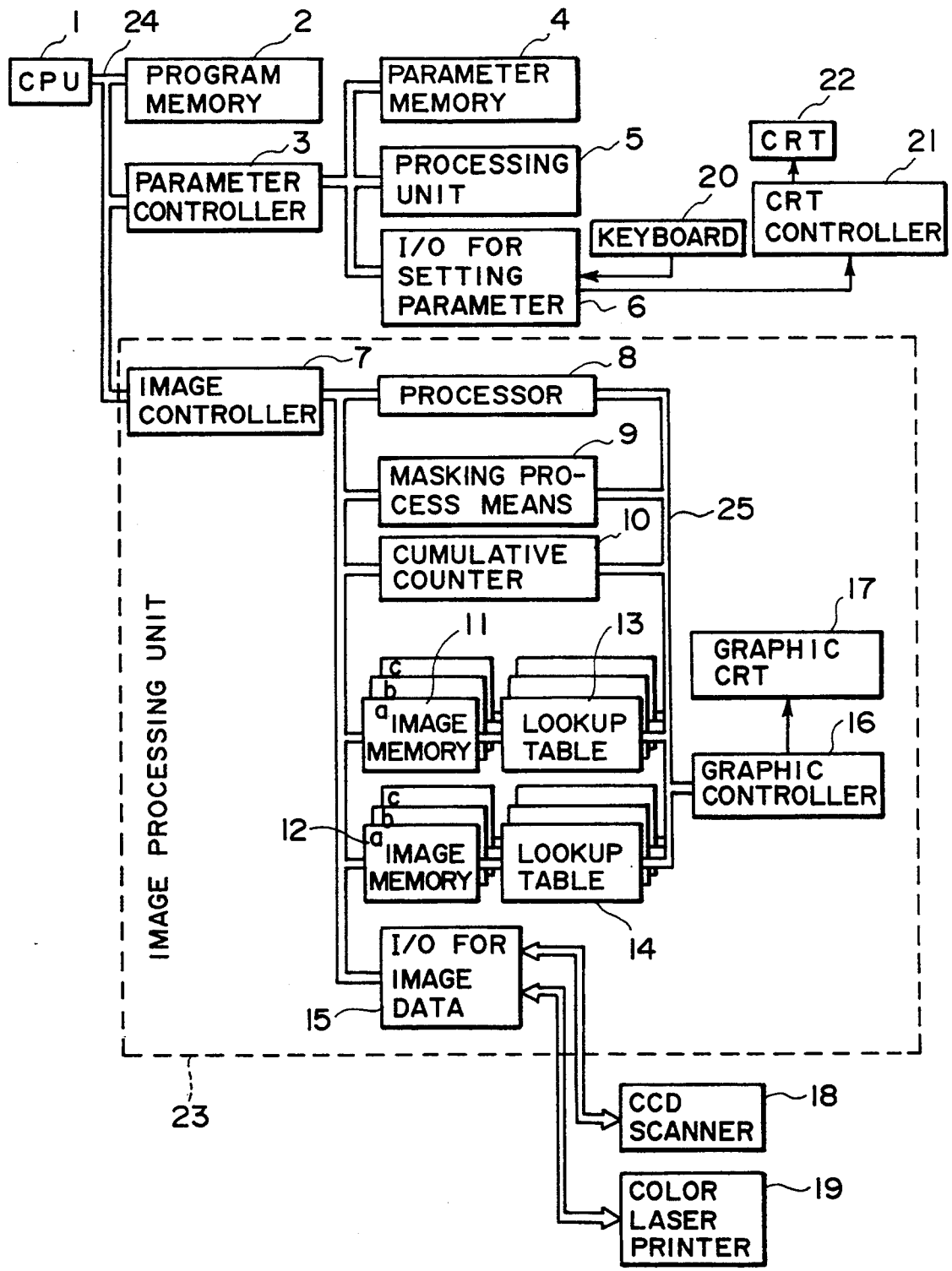
F I G. 1

FIG. 2

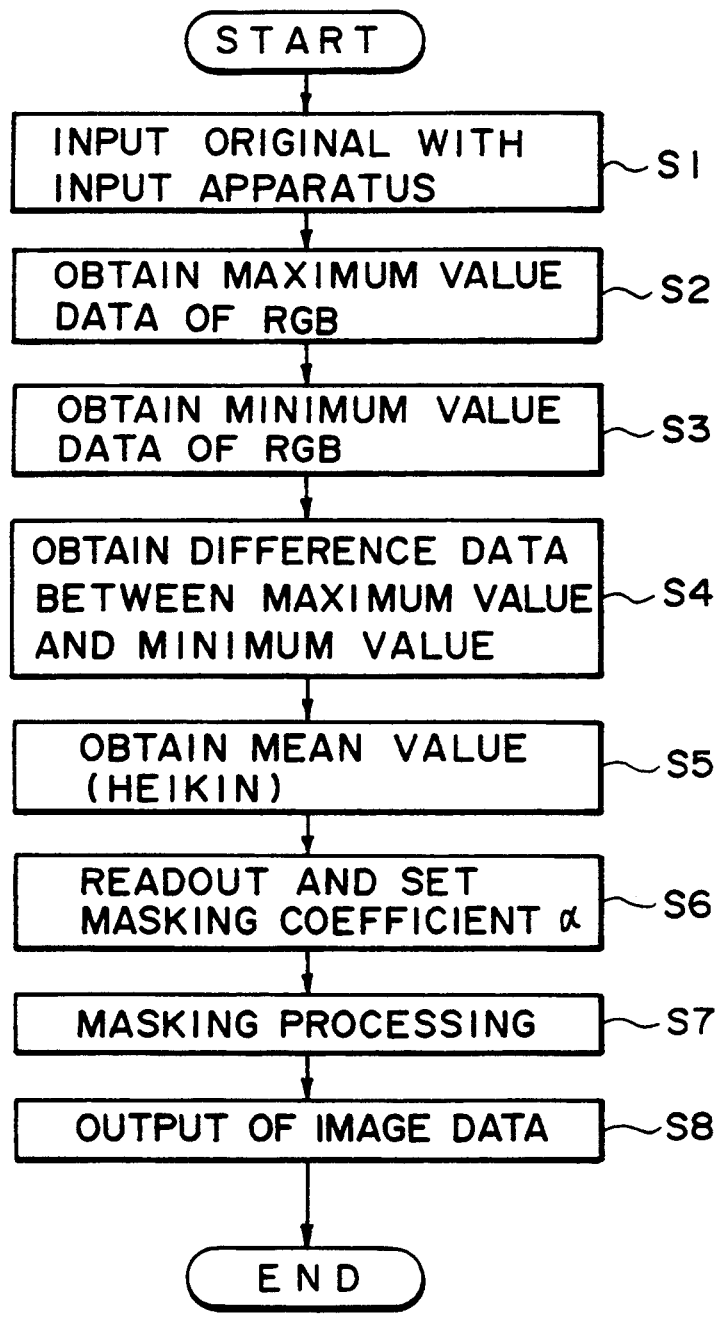
F I G. 3

| HEIKIN | NOUDO_0 | NOUDO_1 | NOUDO_2 |
|---|---|---|---|
| 0 | 0.0 | 0.0 | 0.0 |
| 1 | 0.0 | 0.0 | 0.0 |
| 2 | 0.0 | 0.0 | 0.0 |
| 15 | 0.0 | 0.30 | 0.26 |
| 16 | 0.30 | 0.28 | 0.25 |
| 17 | 0.29 | 0.27 | 0.24 |
| 18 | 0.28 | 0.26 | 0.23 |
| 28 | 0.04 | 0.02 | 0.01 |
| 29 | 0.03 | 0.01 | 0.00 |
| 30 | 0.02 | 0.01 | 0.00 |
| 31 | 0.01 | 0.00 | 0.00 |
| 32 | 0.01 | 0.00 | 0.00 |
| 33 | 0.00 | 0.00 | 0.00 |
| 40 | 0.00 | 0.00 | 0.00 |
| 41 | 0.00 | 0.00 | -0.01 |
| 42 | 0.00 | 0.00 | -0.01 |
| 43 | 0.00 | -0.01 | -0.02 |
| 44 | -0.01 | -0.01 | -0.03 |
| 45 | -0.01 | -0.02 | -0.04 |
| 46 | -0.02 | -0.03 | -0.05 |
| 75 | -0.30 | -0.31 | -0.33 |
| 76 | 0.00 | 0.00 | 0.00 |
| 255 | 0.00 | 0.00 | 0.00 |

FIG. 4

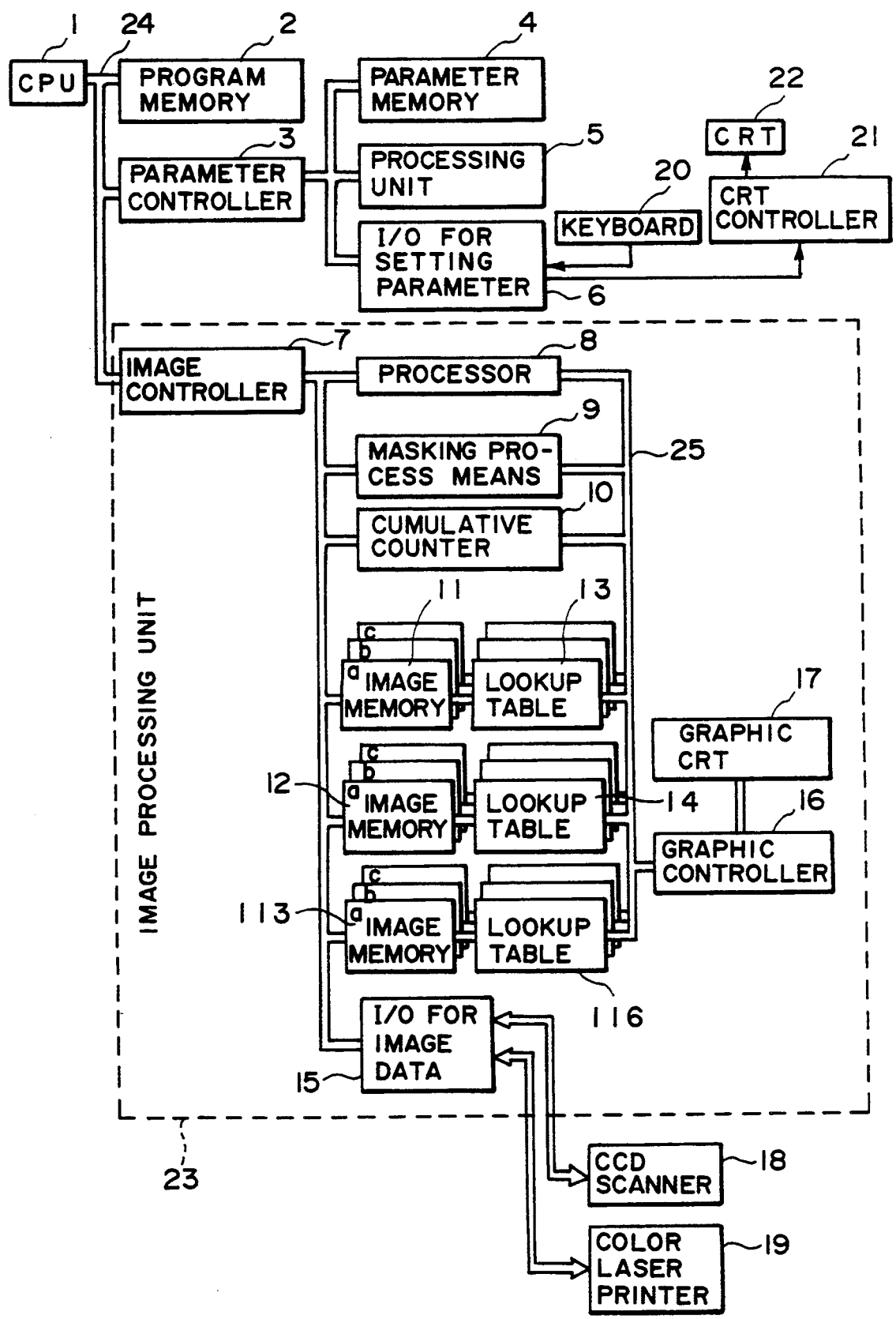
F I G. 5

IMAGE PROCESSING METHOD AND APPARATUS CAPABLE OF AUTOMATIC COLOR MASKING

BACKGROUND OF THE INVENTION

1. Field of the Invention

The present invention relates to an image processing method and apparatus particularly for color image processing.

2. Related Background Art

In a color image input/output system such as a color scanner and laser color printer, a density signal for each color read from a color original by using a reader (e.g., color scanner) is subjected to gradation processing and thereafter, is supplied to an image output device (e.g., a laser color printer). In most cases, the density signal is corrected by using a gradation conversion table so as to obtain a final output image having a visually proper or favorable quality (final output image is an image directly outputted from a laser color printer, or a print obtained from a dot matrix of a color scanner).

Specifically, in a color print system using a color scanner, a scanner head is manually set at a particular point on a scanner drum to check the final dot percent for each color (e.g., yellow, cyan, magenta). If it is determined that a desired final dot percent cannot be obtained, the values in a gradation conversion table are manually corrected by actuation of an adjusting knob. Alternatively, in a system using a layout scanner, an original is displayed on a graphics display to designate the particular point with a light pen, joy stick or the like and to correct the gradation table in the similar manner as above.

As a method of automatically correcting the gradation table, there is known a method whereby an average value for each color R (red), G (Green), B(Blue), or Y(Yellow), M(magenta), C(Cyan) of image data is obtained to give a bias to the image data (i.e., to perform a parallel displacement of the gradation table). There is also known a method whereby the gradation table is corrected such that the highlight point (with lowest density value or with pixels whose values are smaller than a predetermined number) and shadow point (with highest density value or with pixels whose values are larger than a predetermined value) of image data take the maximum and minimum value (255 and 0 for 8 bit digital data, respectively).

According to the above conventional methods, the gamma conversion is carried out for each image plane, R, G and B (or Y, M and C), by using the gradation table to thereby obtain a visually fine or favorable image quality. These methods therefore do not consider an automatic correction of color hue. In other words, masking is not carried out automatically.

SUMMARY OF THE INVENTION

It is therefore an object of the present invention to provide an image processing method and apparatus capable of obtaining an image with visually favorable quality.

It is another object of the present invention to provide an image processing method and apparatus capable of reproducing favorable color.

It is a further object of the present invention to provide an image processing method and apparatus capable of reproducing a fade-out image as an image without fading.

According to a preferred embodiment of this invention aiming at solving the above problems, there is disclosed an image processing apparatus wherein differences between the maximum and minimum values of predetermined pixel data of an image to be processed, for three dimensional pixel data, are obtained, the obtained results for the desired pixel data are calculated, and a color correction masking coefficient is determined in accordance with the calculated result.

It is a still further object of the present invention to provide an image processing method and apparatus capable of determining if an image to be processed needs to be subjected to color masking correction.

The above and other objects, features and advantages of the present invention will become apparent from the following description of the preferred embodiments when read in connection with the accompanying drawings.

BRIEF DESCRIPTION OF THE DRAWINGS

FIG. 1 is a block diagram showing the outline of a first embodiment of an image processing apparatus capable of reproducing a visually favorable color.

FIG. 2 is a diagram showing the image memories shown in FIG. 1 and the calculation method for image memory data.

FIG. 3 is a flow chart illustrating the operation of the embodiment shown in FIG. 1.

FIG. 4 shows the data structure of a masking coefficient table in the parameter memory shown in FIG. 1.

FIG. 5 is a block diagram showing the outline of a second embodiment of the image processing apparatus.

DETAILED DESCRIPTION OF THE PREFERRED EMBODIMENTS

Figure 6:
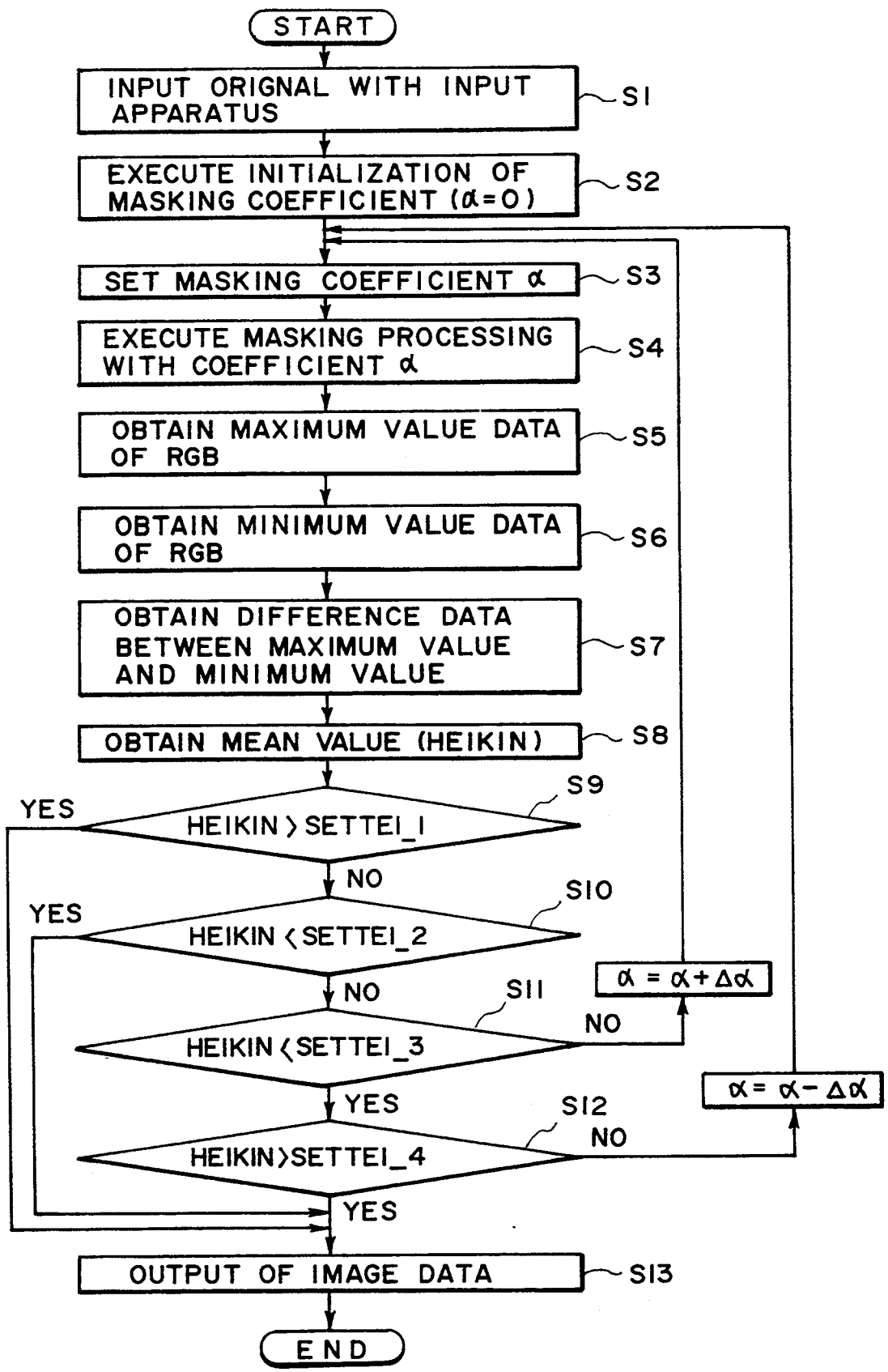
FIG. 6 is a flow chart illustrating the operation of the second embodiment shown in FIG. 5.

Prior to describing the embodiments of the present invention, the results of experiments constituting the background art of this invention will be first described. According to the Evans theory, the integrated value for each R, G, B data of an ordinary color image statistically takes substantially a constant level. This statistical fact is applied to the above-described gamma conversion. The present inventor considered if this statistical tendency is present also for color balance. From experiments aiming at quantitatively determining the favorable visual sense of image, the following facts were found.

If an average value of differences between maximum and minimum values of pixel data within an R, G and B digital color image for each R, G and B data, falls within a certain range, the image is visually sensed favorably. If the average value is larger than the upper limit of the range, the color hue of the image is sensed flashily, whereas if the average value is smaller than the lower limit of the range, the image is sensed as a whole as being faded out.

In the experiments, a photograph was used as an input color image, the density at each pixel of the image within the density range of 0 to 2.0 was A/D converted into 8 bit data, and the average value was calculated. According to the experiments, the average value count of about 30 to 40 indicated that the image was visually sensed favorably. Images regarded as favorable even if they have the count in excess of this range, are particular images such as spot-lighted scenes at a concert, etc., poster images mainly composed of characters and illustrations, and the like. This invention aims at making visually favorable, not such particular images but ordinary images such as general scenes, pictures taken at social gatherings, portraits and the like. The average value count 30 to 40 is specific to the characteristics of the equipment used in the experiments, such as spectrum filter characteristics and sensitivity characteristics of the input device, and coloring characteristics of the output device. Therefore, the invention is not limited to such average value count, but the value count is dependent upon the apparatus to be used.

According to the preferred embodiments to be described later, there is disclosed an apparatus for automatically performing a masking process, which apparatus comprises means for calculating a difference between maximum and minimum values for each pixel data for three dimensional different image data such as R, G and B data, means for obtaining an average value of the calculated differences; masking process means for mask-processing an image by using an optional coefficient; and means for judging if the average value is within a predetermined range. The invention is applicable to various image processing apparatus while reproducing a visually favorable image. Such image processing apparatus include color image input/output means such as laser color copying machines, print layout systems, image editing apparatus, image data retrieving apparatus, and the like.

The preferred embodiments of the present invention will be described in detail with reference to the accompanying drawings.

FIG. 1 is a block diagram showing the outline of the first embodiment of the image processing apparatus according to the present invention. With this apparatus, an image read with a CCD scanner is processed to obtain a favorable reproduced color which is outputted to a color laser printer.

Referring to FIG. 1, a control processor (CPU) 1 controls the entirety of the apparatus. A program memory 2 stores therein control programs for CPU 1 and various data. A parameter controller 3 controls a processing unit 5, parameter memory 4, and parameter setting I/O 6 upon an instruction from CPU 1, to thereby perform parameter initialization, setting, comparison and the like necessary for the control to be described later. The parameter setting I/O 6 is connected to a keyboard 20 from which various commands and instructions are inputted, and connected to a CRT 22 for the display of inputted data.

A processor 8 and CPU 1 are interconnected via a CPU bus 24 and an image controller 7. The processor 8 which is the main device in image processing unit 23, receives image data from one of image memories 11 and 12 selected upon an instruction from CPU 1, or from an image data I/O 15, and processes the received data. The processes executed by the image controller 7 include: four fundamental arithmetic operations, logical operation, max/min operation, respectively for each image memory plane and for arbitrary constants; calculation of a difference between maximum and minimum values for each pixel of R, G and B image data; and conversion of R, G and B image data into other three-dimensional coordinate systems such as the HLS or YIQ coordinate system. The operation results obtained by the image controller 7 are returned to the selected one of the image memories 11 and 12.

Figure 2:
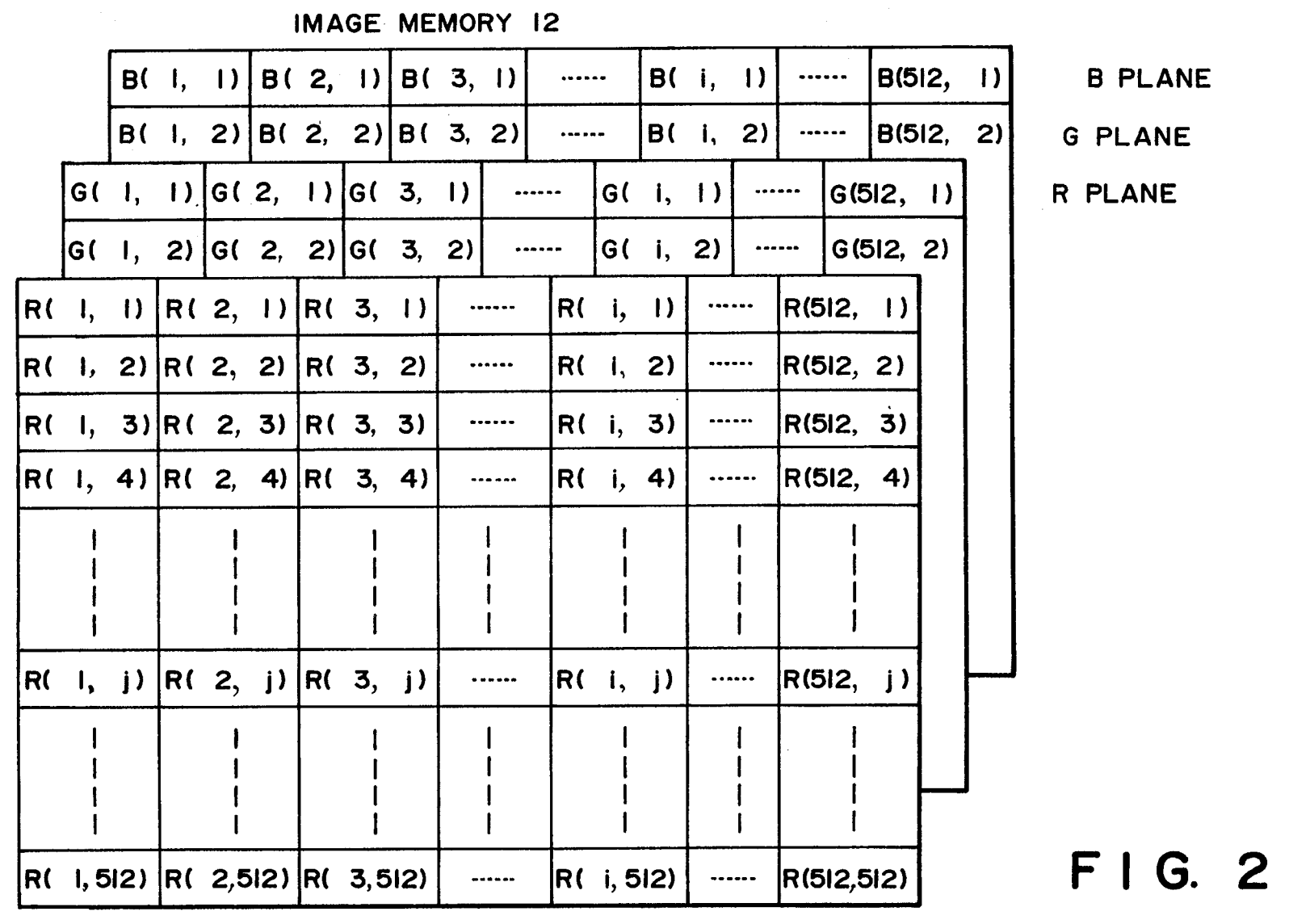

A masking process means 9 performs a masking process (of obtaining one pixel datum from three pixel data at three planes, by using four fundamental arithmetic operations) by using a coefficient $\alpha$ set for three R, G and B planes of the selected image memory 11, 12. The calculated results are written in the selected one of the image memory 11, 12 at an arbitrary plane thereof. This operation will be described more particularly with reference to FIG. 2.

FIG. 2 shows the detailed structure of the image memory 12. In this embodiment, the size of one screen frame is 512×512 pixels. The image memory is constructed of three planes which are allocated to R, G and B. Each pixel datum R (i, j), G(i, j), B(i, j) is quantized in units of 8 bits (0 to 255). Each R, G, B plane shown in FIG. 2 is processed by using a coefficient $\alpha$ set at masking process means 9, and the processed results are outputted as expressed in the following equations:

$$R'(i,j) = (1.0 + 2*\alpha)*R(i,j) - \alpha*G(i,j) - \alpha*B(i,j)$$

$$G'(i,j) = -\alpha*R(i,j) + (1.0 + 2*\alpha)*G(i,j) - \alpha*B(i,j)$$

$$B'(i,j) = -\alpha*R(i,j) - \alpha*G(i,j) + (1.0 + 2*\alpha)*B(i,j)$$

where $1 \leq i, j \leq 512$.

A cumulative counter 10 counts the sum of pixel data values of a selected plane of the image memories 11 and 12. For example, $\Sigma R(i, j)$ is counted for the R plane shown in FIG. 2. An average value $\Sigma R(i, j)/N$ (N is the total number of pixels) is then calculated.

FIG. 4 shows a table for storing masking coefficients $\alpha$ to be set by masking process means 9. The coefficient $\alpha$ takes different values depending upon the dynamic range of an input device and upon the HEIKIN (average) value to be described later. The dynamic range differs for each column in the table, and the HEIKIN value differs for each row in the table. Namely, the dynamic range NOUDO 0 (density) is for a density of 0 to 2.0, NOUDO 1 for 0 to 2.5, and NOUDO 2 for 0 to 3.0. The coefficient values $\alpha$ shown in the table of FIG. 4 are stored in actuality by using coded data. The table is included in the parameter memory shown in FIG. 2.

The image data I/O 15 is an interface for the input/output of image data, and is connected to the image input/output devices including in this embodiment a CCD color scanner 18 and color laser printer 19 which are selectively used upon an instruction from CPU 1. The color laser printer 19 itself has a masking process circuit for correcting the coloring characteristics of inputted digital color data.

The image memories 11 and 12 each are constructed of three channel frames (e.g., R, G and B or H, L and S). The image memories 11 and 12 are connected to both CPU bus 24 and video bus 25 so that CPU 1 can access both the image memories 11 and 12. Also, the image data in either of the memories can be processed by the processor 8.

The image memories 11 and 12 are connected via the video bus 25 to look-up tables 13 and 14 of high speed RAMs, respectively. Each look-up table has an address space of 256×8 bits. Eight address lines of the look-up table are directly connected to an 8 bit (256 tonal levels) output of the corresponding image memory. The output data lines of the look-up table are connected to the video bus 25. CPU 1 can freely read/write image data from/into the look-up tables 13 and 14 via the image controller 7 and processor 8.

A graphic controller 16 controls a graphics CRT 17 to display image data. The graphic controller 16 selects one of the image memories 11 and 12 in accordance with an instruction from CPU 1, and converts the digital image signal outputted from the corresponding look-up table 13, 14 into an analog video signal to display it on the graphics CRT 17.

CRT 22 is used for notifying an operator of an instruction by displaying on it the set parameter or a parameter setting request.

DESCRIPTION OF PROCESS OPERATION

FIG. 3 is a flow chart illustrating the operation of the embodiment which allows favorable color reproduction, and FIG. 4 shows as described previously the contents of the parameter memory 4. The operation of the image processing apparatus constructed as above will be described with reference to the flow chart shown in FIG. 3.

At step S1, CPU 1 sets the image data I/O 15 at an input device selection mode, and the conditions of the image input device for inputting original image data, in this case, the conditions of the CCD scanner 18, are inputted. This input operation is carried out by displaying the dynamic ranges for the CCD scanner 18 on CRT 22 and notifying an operator of a request to input any one of the displayed dynamic ranges. The inputted dynamic range determines the range of the original image density to be used in processing the original image. The original image data within the determined range are expressed by 8 bit data having 1 to 255 tonal levels. In this embodiment, the three dynamic ranges of 0 to 2.0, 0 to 2.5, and 0 to 3.0 are used as described previously. An operator selects one of the dynamic ranges, which is stored as one of the values of NOUDO 0, 1, and 2 in the parameter memory 4.

Upon setting the input conditions of image data, CPU 1 causes the processor 8 to notify, via the image data I/O 15, the CCD scanner 18 of the set conditions. In accordance with the notified conditions, the CCD scanner 18 reads the original image data and stores respective R, G and B components thereof in the image memory 11.

At step S2, the maximum values of pixel data for respective pixel points of three planes (R, G, B) are obtained. First, the pixel data at the R or a plane of the image memory 11 are compared with the pixel data at the G plane or b plane under control of the processor 8. The larger value thereof is stored in the image memory 12 at the a plane. Next, the pixel data at the a plane of the image memory 12 are compared with the pixel data at the B plane or c plane of the image memory 11 under control of the processor 8. The larger value thereof is stored in the image memory 12 at b, the value stored in the image memory 12 at the b plane being the maximum value of pixel data for one pixel point. The maximum values for all pixels are stored in the above manner.

At step S3, the minimum values of pixel data for respective pixel points of three planes (R, G, B) are obtained. First, the pixel data at the R or a plane of the image memory 11 are compared with the pixel data at the G plane or b plane under control of the processor 8. The smaller value thereof is stored in the image memory 12 at the a plane. Next, the pixel data at the a plane of the image memory 12 are compared with the pixel data at the B plane or c plane of the image memory 11 under control of the processor 8. The smaller value thereof is stored in the image memory 12 at c, the value stored in the image memory 12 at the c plane being the minimum value of pixel data for one pixel point. The minimum values for all pixels are stored in the above manner.

At step S4, based upon the pixel data stored at step S2 in the image memory at the b plane and the pixel data stored at step S3 in the image memory at the c plane, a difference therebetween is obtained for each pixel point through calculation by the processor 8. The results are written in the image memory 12 at the a plane.

At step S5, an average value of pixel data in the image memory 12 at the a plane is calculated and stored as the variable HEIKIN. The more detailed operation at step S5 will be given below. Upon reception of an instruction from CPU 1 via the image controller 7, the cumulative counter 10 operates on the results obtained in step S4, and, more specifically, counts the sum of pixel data in the image memory 12 at the a plane, to thus obtain $\Sigma X(i, j)$, wherein $X(i, j)$ represents 8 bit data, and i, and j are each integers from 1 to 512. The sum is then divided by the total number N (512 * 512) of pixels to obtain an average value (variable HEIKIN). The decimal of the average value HEIKIN is cut off to obtain an integer variable which takes a value 0 to 255.

At step S6, in accordance with the obtained variable HEIKIN and the set value NOUDO of the dynamic range of the input device, the masking coefficient $\alpha$ is read from the data table (FIG. 4) in the parameter memory 4, and set at masking process means 9. Specifically, CPU 1 generates an address of the data table in the parameter memory 4 to access the masking coefficient corresponding to the variable HEIKIN and NOUDO value. The read-out masking coefficient is set at masking process means 9 by means of the parameter controller 3 and image controller 7. For example, for the variable HEIKIN of 18 and the dynamic range set value NOUDO of 0 (range from 0 to 2.0), the masking coefficient $\alpha$ of 0.28 is read and set at masking process means 9.

At step S7, masking process is performed by masking process means 9. First, image data are read from the image memory 11 at the R, G and B planes to execute the following processes. First, the following calculation is carried out and the results are stored in the image memory 12 at the a plane:

$$(1.0+2*\alpha)*R(i,j)-\alpha*G(i,j)-\alpha*B(i,j)$$

Next, the following calculation is carried out and the results are stored in the image memory 12 at the b plane:

$$-\alpha*R(i,j)+(1.0+2*\alpha)*G(i,j)-\alpha*B(i,j)$$

Lastly, the following calculation is carried out and the results are stored in the image memory 12 at the c plane (variables i, and j take a value from 1 to 512):

$$-\alpha*R(i,j)-\alpha*G(i,j)+(1.0+2*\alpha)*B(i,j)$$

In the above calculations, if the operation result is an over-flow (in excess of 255), then the value 255 is used, whereas if it is an under-flow (negative value), then the value 0 is used.

At step S8, the image data I/O 15 is switched from the input device selection mode to an output device selection mode, and the processed image data are outputted to the color laser printer via the image data I/O 15. Specifically, the data in the image memory 12 are transferred via the image data I/O 15 to the color laser printer 19 under control of CPU 1. After data transfer, an instruction to output an image is sent to the color printer 19, to complete the image data output.

In the above embodiment, obtaining an average value, generating an address, and setting a parameter are carried out in accordance with a software sequence using a microcomputer. It is obvious however that dedicated hardware may be used instead to obtain the same advantages of this invention. Further, in the above embodiment, only the masking process has been described in performing a favorable image reproduction. It is obvious however that a conventional technology of gamma conversion may well be used in combination with the masking process.

Other Embodiment

Various modifications which use the following methods may be made in place of the above embodiment wherein the masking coefficient is obtained by using the dynamic range of an input device and the average value of differences between maximum and minimum values for three (R, G and B) planes.

(1) The masking process is carried out by using the following matrix:

$$\begin{pmatrix} R' \\ G' \\ B' \end{pmatrix} = \begin{pmatrix} \alpha 11 & \alpha 12 & \alpha 13 \\ \alpha 21 & \alpha 22 & \alpha 23 \\ \alpha 31 & \alpha 32 & \alpha 33 \end{pmatrix} \cdot \begin{pmatrix} R \\ G \\ B \end{pmatrix}$$

where $\alpha ij$, $1 < i, j < 3$ wherein there are provided memory tables the contents of which are identified by the dynamic range of an input device and the average value of differences for each of three (R, G and B) planes. According to this method, although a masking coefficient differs more or less depending upon each plane, a masking coefficient specific to a particular plane can be selected. In addition, calculations such as $(1.0 + 2 * \alpha)$, $(1.0 - \alpha)$ in the above embodiment is not necessary.

(2) Instead of preparing all the masking coefficients for the average values 0 to 255, representative coefficients only are stored in the memory table. A coefficient for each average value is obtained through interpolation, and set at masking process means. For example, instead of preparing all the masking coefficients for the average values 0 to 255 as shown in FIG. 4, masking coefficients for every tenth average value may be stored in the memory table. The coefficient for an intermediate average value is then obtained through interpolation.

(3) In the previous embodiment, a masking coefficient table is prepared to make up for a difference (nonuniformity) of dynamic range of an input apparatus, and a coefficient is selected on the basis of both average value and a value indicative of a dynamic range. However, according to the following method a masking coefficient may be selected by using a memory table including variables of average values only. Namely, an average value of data of a difference between maximum and minimum values for each image pixel in a previous embodiment is divided by the density value (2.0, 2.5 or 3.0) of the dynamic range. Then, on the basis of an integer proportional to the value obtained by the division, a masking coefficient is selected with reference to a memory table. In this case, as a matter of course, the memory table corresponds to a table including values obtained by the dividing average count values by density value.

In the above embodiment, as the data at different three dimensional planes of a color image, R, G and B data are used. The invention is not limited thereto, but other data such as Y, M and C data, Y, I and Q data, and H, L and S data may also be used.

As appreciated from the description of the above embodiment, an operator is not required to designate a particular masking coefficient, but the coefficient is automatically determined in accordance with the image quality to thus allow a visually favorable image output.

Further, the problem of emphasizing the color hue of a negative film more than necessary when outputting it as a positive film can be readily solved. In addition, a fade-out original image can be automatically corrected.

As described so far, according to the image processing method of this embodiment, it is possible to reproduce an image visually favorably.

Next, the second embodiment of the present invention will be described. With this embodiment, the quality of an image to be processed is checked as to whether the quality is required to be corrected. If correction is necessary, the masking coefficient is corrected to obtain a favorable image.

The structure of the apparatus of the second embodiment is shown in FIG. 5 wherein components having similar functions to those shown in FIG. 1 are represented by using identical reference numerals, and the description therefor is omitted.

In this embodiment shown in FIG. 5, different from the embodiment shown in FIG. 1, in addition to the image memories 11 and 12, there are provided an image memory 113 and look-up table 116. The image memory 11 is used for storing original image data, image memory 12 for storing image data after masking processing, and image memory 113 for a work memory during calculation.

Masking process means 9 performs a masking process (of obtaining one pixel data from three pixel data at three planes through four fundamental arithmetic calculations) by using a coefficient $\alpha$ set for three (R, G and B) planes and stored in the image memory 11. The result is written in the image memory 12 at a particular plane thereof.

The structure of the image memories 11, 12 and 113 is the same as shown in FIG. 2. The look-up table 116 has the same structure as that of the look-up tables 13, 14.

Figure 7:
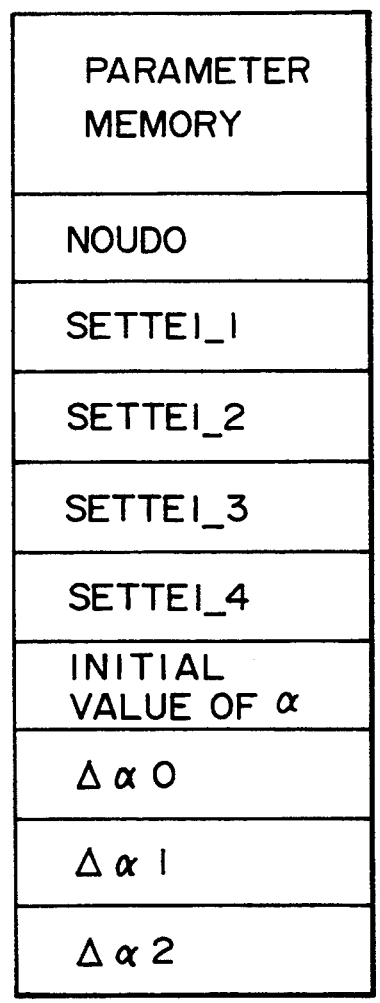
FIG. 7 shows the data structure of the parameter memory shown in FIG. 5.

FIG. 7 shows the contents of a data table stored in the parameter memory 4, the table storing parameters used for incrementing or decrementing the masking coefficient $\alpha$ to be set at masking processing means 9. The coefficient changes with the dynamic range set for an input device.

Specifically, $\Delta\alpha 0$ stands for the inputted dynamic range of 0 to 2.0, $\Delta\alpha 1$ for that of 0 to 2.5, and $\Delta\alpha 2$ for that of 0 to 3.0. Namely, the address of the contents to be accessed in the table changes with the dynamic range of an input device.

DESCRIPTION OF PROCESS OPERATION

FIG. 6 is a flow chart showing the operation of reproducing a favorable color according to the second embodiment of this invention.

The operation of the image processing apparatus constructed as above will be described with reference to the flow chart shown in FIG. 6.

At step S1, CPU 1 sets the image data I/O 15 in an input device selection mode, and the conditions of the image input device for inputting original image data, in this case, the conditions of the CCD scanner 18, are inputted. This input operation is carried out by displaying the dynamic ranges for the CCD scanner 18 on CRT 22 and notifying an operator of a request to input any one of the displayed dynamic ranges. The inputted dynamic range determines the range of the original image density to be used in processing the original image. The original image data within the determined range are expressed by 8 bit data having 0 to 255 tonal levels. In this embodiment, the three dynamic ranges of 0 to 2.0, 0 to 2.5, and 0 to 3.0 are used as described previously. An operator selects one of the dynamic ranges, which is stored as one of the values of NOUDO 0, 1, and 2 in the parameter memory 4.

Upon setting the input conditions of image data, CPU 1 causes the processor 8 to notify, via the image data I/O 15, the CCD scanner 18 of the set conditions. In accordance with the notified conditions, the CCD scanner 18 reads the original image data and stores respective R, G and B components thereon in the image memory 11.

At step S2, CPU 1 initializes the masking coefficient to 0.

At step S3, the masking coefficient initialized at step S2 is set at masking process means 9.

At step S4, masking process is performed by masking process means 9. First, image data are read from the image memory 11 at the R, G and B planes and inputted to masking processing means 9 to execute the masking process. After the masking process, the results are outputted to the image memory 12 whereat the following processes are carried out.

First, the following calculation is carried out for the masking process at the R plane, and the results are stored in the image memory 12 at the $\underline{a}$ plane:

$$(1.0+2*\alpha),R(i,j)-\alpha*G(i,j)-\alpha*B(i,j)$$

Next, the following calculation is carried out for the masking process at the G plane, and the results are stored in the image memory 12 at the $\underline{b}$ plane:

$$-\alpha*R(i,j)+(1.0+2*\alpha)*G(i,j)-\alpha*B(i,j)$$

Lastly, the following calculation is carried out for the masking process at the B plane, and the results are stored in the image memory 12 at the $\underline{c}$ plane:

$$-\alpha*R(i,j)-\alpha*G(i,j)+(1.0+2*\alpha)*B(i,j)$$

In the above calculations, if the operation result is an over-flow (in excess of 255), then the value 255 is used, whereas if it is an under-flow (negative value), then the value 0 is used.

At step S4 after the initialization of the masking coefficient $\alpha=0$, the contents 0 of the image memory 11 are simply copied into the image memory 12.

At step S5, the maximum values of pixel data for respective pixel points of three planes (R, G, B) are obtained. First, the pixel data at the R or $\underline{a}$ plane of the image memory 12 are compared with the pixel data at the G plane or $\underline{b}$ plane under control of the processor 8. The larger value thereof is stored in the image memory 13 at the $\underline{a}$ plane. Next, the pixel data at the $\underline{a}$ plane of the image memory 13 are compared with the pixel data at the B plane or $\underline{c}$ plane of the image memory 12 under control of the processor 8. The larger value thereof is stored in the image memory 13 at $\underline{b}$, the value stored in the image memory 13 at the $\underline{b}$ plane being the maximum value of pixel data for one pixel point. The maximum values for all pixels are stored in the above manner.

At step S6, the minimum values of pixel data for respective pixel points of three planes (R, G, B) are obtained. First, the pixel data at the R or $\underline{a}$ plane of the image memory 12 are compared with the pixel data at the G plane or $\underline{b}$ plane under control of the processor 8. The smaller value thereof is stored in the image memory 13 at the $\underline{a}$ plane. Next, the pixel data at the $\underline{a}$ plane of the image memory 13 are compared with the pixel data at the B plane or $\underline{c}$ plane of the image memory 12 under control of the processor 8. The smaller value thereof is stored in the image memory 13 at the $\underline{c}$, the value stored in the image memory 13 at $\underline{c}$ plane being the minimum value of pixel data for one pixel point. The minimum values for all pixels are stored in the above manner.

At step S7, based upon the pixel data stored at step S5 in the image memory 13 at the $\underline{b}$ plane and the pixel data stored at step S6 in the image memory 13 at the $\underline{c}$ plane, a difference therebetween is obtained for each pixel point through calculation by the processor 8. The results are written in the image memory 13 at the $\underline{a}$ plane.

At step S8, an average value of pixel data in the image memory 13 at the $\underline{a}$ plane is calculated and stored as the variable HEIKIN. The more detailed operation at step S8 will be given below. Upon reception of an instruction from CPU 1 via the image controller 7, the cumulative counter 10 operates on the differences calculated in step S7, by counting the sum of pixel data in the image memory 13 at the $\underline{a}$ plane, to thus obtain $\Sigma$ X(i, j), wherein X(i, j) represents 8 bit data, and i and j are each intergers from 1 to 512. The sum is then divided by the total number N (512×512) of pixels to obtain an average value (variable HEIKIN). The decimal of the average value HEIKIN is cut off to obtain an integer variable which takes one of 0 to 255. The above operation from step S5 to step S8 are substantially the same as those steps at S2 to S5 shown in FIG. 3.

Next, at step S9, the variable HEIKIN is compared with a predetermined value SETTEI 1 (set value 1) stored previously in the parameter memory 4. If the variable HEIKIN is larger than the value SETTEI 1, the control advances to step S13. The SETTEI value 1 corresponds to color characters or illustrations which are regarded as not requesting favorable color reproduction as in the case of ordinary images. Therefore, the control branches from step S9 to S13 to output image data without masking processing.

At step S10, the HEIKIN is compared with a predetermined value SETTEI 2 (set value 2) stored previously in the parameter memory 4. If the variable HEIKIN is larger than the value SETTEI 2, the control advances to step S13. The value SETTEI 2 corresponds to monochrome images or image having an extremely small color image portion which are regarded as not requesting faborable color reproduction as in the case of ordinary images. Therefore, the control branches from step S9 to S13 to output image data without masking processing. On the contrary, if such an image (monochrome image) is emphasized through the masking process, the effect of color shift of an input device is exaggerated to thus result in a visually unfavorable image.

At steps S11 and S12, it is checked if the variable HEIKIN is larger than a predetermined upper limit value SETTEI 3 or smaller than a predetermined lower limit value SETTEI 4.. At step S11, if the variable HEIKIN is not larger than the value SETTEI 3, the coefficient $\alpha$ is incremented to $\alpha = \alpha + \Delta\alpha$ and the control returns to step S3. The value $\Delta\alpha$ corresponding to the variable NOUDO representative of the dynamic range of the input device is read from the parameter memory 4. If the variable HEIKIN in larger than the value SETTEI 3, the control advances to step S12 whereat the coefficient $\alpha$ is decremented to $\alpha = \alpha - \Delta\alpha$ and the control returns to step S3. Also in this case, the value $\Delta\alpha$ corresponding to the variable NOUDO representative of the dynamic range of the input device is read from the parameter memory 4. If the variable HEIKIN is not larger than the value SETTEI 4, the control advances to step S13.

At step S13, the image data I/O 15 is switched from the input device selection mode to an output device selection mode, and the processed image data are outputted to the color laser printer 19 via the image data I/O 15. Specifically, the data in the image memory 12 are transferred via the image data I/O 15 to the color laser printer 19 under control of CPU 1. After data transfer, an instruction to output an image is sent to the color printer 19, to complete the image data output.

In the above embodiment, obtaining an average value, generating an address, and setting a parameter are carried out in accordance with a software sequence using a microcomputer. It is obvious however that dedicated hardware may be used instead to obtain the same advantages of this invention. In the above embodiment, the masking coefficient is incremented or decremented to set the average value of differences between maximum and minimum values of each pixel within a predetermined range. Other known operations on the masking coefficient may be used so long as the average value is set within the predetermined range.

Further, in the above embodiment, only the masking process has been described in performing a favorable image reproduction. It is obvious however that a conventional technology of gamma conversion may well be used in combination with the masking process. In the embodiment shown in FIG. 5, one of the increment/decrement $\Delta\alpha$ values $\Delta\alpha 0$, $\Delta\alpha 1$ and $\Delta\alpha 2$ is selected for each dynamic range of an input device. However, one increment/decrement value only may be used, in the following manner. Specifically, in the similar manner as of the embodiment shown in FIG. 1, valuable $\Delta\alpha$ is set to a value corresponding to a density. For example, an average value of data of a difference between maximum and minimum values for each image pixel in a previous embodiment is divided by the density value (2.0, 2.5 and 3.0) of the dynamic range. Then, on the basis of an integer proportional to the value obtained by the division, a masking coefficient is selected. In this case, as a matter of course, a value of $\Delta\alpha$ in a parameter memory is set to a value obtained by dividing average count value by the density value.

As appreciated from the description of the above embodiment, an operator is not required to designate a particular masking coefficient, but the coefficient is automatically determined in accordance with the image quality, and if a masking correction is necessary, the coefficient is automatically corrected, to thus allow a visually favorable image output.

Further, the problem of emphasizing the color hue of a negative film more than necessary when outputting it as a positive film can be readily solved. In addition, a fade-out original image can be automatically corrected. Furthermore, according to this embodiment, an original of color characters or monochrome images can be processed properly.

As described so far, according to the image processing method of this embodiment, it is possible to reproduce an image visually favorably.

According to the first and second embodiments, the masking coefficient is determined based on an average value of differences between maximum and minimum values of all pixels within a screen image. The masking coefficient may also be determined in such a manner that R, G and B data for each pixel are converted into H, L and S (hue, lightness, saturation) data, an average of S data within a screen image is obtained, and the masking coefficient is determined so as for the S data average to have a predetermined value.

What is claimed is:

1. An image processing method comprising the steps of:
   inputting a plurality of color component signals;
   detecting, in units of a pixel, a maximum component value and a minimum component value from among the plurality of color component signals;
   calculating, in units of a pixel, the difference between the maximum and the minimum component values for that pixel;
   determining a parameter for color correction based on an average value of differences corresponding to a plurality of pixels;
   color correcting an image represented by the plurality of color component signals by producing color corrected color component signals in accordance with the parameter so that a color balance of the image is visually sensed favorably; and
   reproducing the image on a color image output device in response to the provision of the color corrected color component signals.

2. An image processing method according to claim 1, wherein the plurality of color component signals are R, G and B component signals.

3. An image processing method according to claim 1, wherein the plurality of color component signals are Y, M and C component signals.

4. An image processing method comprising the steps of:
   inputting a plurality of color component signals;
   detecting, in units of a pixel, a maximum component value and a minimum component value from the plurality of color component signals;
   calculating, in units of a pixel, the difference between the maximum and the minimum component values for that pixel; and
   determining a parameter for color correction based on an average value of differences corresponding to a plurality of pixels;
   color correcting an image represented by the plurality of color component signals by producing color corrected color component signals in accordance with the result obtained in said determining step, wherein the color correction performed in said color correcting step is a color correction based on a color correction masking coefficient, and the color correction masking coefficient is determined in accordance with the parameter determined in said determining step so that a color balance of the image is visually sensed favorably; and reproducing the image on a color image output device in response to the provision of the color corrected color component signals.

5. An image processing method according to claim 1, wherein the plurality pixels include all the pixels of the image.

6. An image processing apparatus comprising:

input means for inputting a plurality of color component signals representing an image;

first calculating means for calculating, for each of a plurality of pixels, a difference between a maximum component value and a minimum component value from among the plurality of color component signals;

second calculating means for performing a calculation using the differences of the plurality of pixels obtained by said first calculating means;

means for judging whether a calculation result obtained by said second calculating means falls within a predetermined range in order to determine a parameter for color correction of the plurality of color component signals;

means responsive to the determined parameter for color correction and the plurality of color component signals for producing color corrected color component signals; and means for reproducing the image on a color image output device in response to the provision of the color corrected color component signals.

7. An image processing apparatus according to claim 6, further comprising processing means for color correcting the pixel data of the image to be processed.

8. An image processing apparatus according to claim 7, further comprising means for controlling said processing means in accordance with a judgment obtained by said judging means.

9. An image processing apparatus according to claim 6, wherein the plurality of color component signals are R, G and B component signals.

10. An image process apparatus according to claim 6, wherein the plurality of color component signals are Y, M and C component signals.

11. An image processing apparatus comprising:

input means for inputting a plurality of color component signals representing an image;

first calculating means for calculating, for each of a plurality of pixels, a difference between a maximum component value and a minimum component value from among the plurality of color component signals;

second calculating means for performing a calculation using the differences for the plurality of pixels obtained by said first calculating means;

means for judging whether a calculation result obtained by said second calculating means falls within a predetermined range in order to determine a parameter for color correction of the plurality of color components signals;

processing means for color correcting the plurality of color component signals using the parameter determined by using the judgement result of said judging means, wherein said processing means color-corrects in accordance with a color correction masking coefficient; and means for reproducing the image on a color image output device in response to the provision of the color corrected color component signals.

12. An image processing method according to claim 1, further comprising the step of image forming according to the corrected image.

13. An image processing method according to claim 12, wherein said image forming step is achieved using a color laser printer.

14. An image processing apparatus according to claim 7, further comprising an image forming means for forming an image according to the pixel data subjected to color correction by said processing means.

15. An image processing apparatus according to claim 14, wherein said image forming means comprises a color laser printer.

* * * * *

UNITED STATES PATENT AND TRADEMARK OFFICE
CERTIFICATE OF CORRECTION

PATENT NO. : 5,398,123
DATED : March 14, 1995
INVENTOR(S) : MAKOTO KATSUMA

It is certified that error appears in the above-identified patent and that said Letters Patent is hereby corrected as shown below:

COLUMN 1

Line 20, "(final output image" should read
--("final output image"--.

COLUMN 7

Line 10, "obvious however" should read --obvious, however,--.
Line 15, "obvious however" should read --obvious, however,--.

COLUMN 8

Line 6, "by" should read --by the--.
Line 56, "13, 14." should read --13, and 14.--.

COLUMN 11

Line 11, "4.." should read --4.--.
Line 38, "obvious however" should read --obvious, however,--.
Line 50, "obvious however" should read --obvious, however,--.

UNITED STATES PATENT AND TRADEMARK OFFICE
CERTIFICATE OF CORRECTION

PATENT NO. : 5,398,123
DATED : March 14, 1995
INVENTOR(S) : MAKOTO KATSUMA

It is certified that error appears in the above-identified patent and that said Letters Patent is hereby corrected as shown below:

COLUMN 14

Line 22, "components" should read --component--.
Line 25, "judgement" should read --judgment--.

Signed and Sealed this

Twenty-second Day of August, 1995

Attest:

BRUCE LEHMAN

Attesting Officer

Commissioner of Patents and Trademarks